(12) United States Patent
Strobel

(10) Patent No.: US 6,612,543 B2
(45) Date of Patent: Sep. 2, 2003

(54) FLUID VALVE

(75) Inventor: Georg Strobel, Obertraubling (DE)

(73) Assignee: Hoerbiger Micro Fluid GmbH, Barbing-Regensburg (DE)

( * ) Notice: Subject to any disclaimer, the term of this patent is extended or adjusted under 35 U.S.C. 154(b) by 0 days.

(21) Appl. No.: 09/963,461

(22) Filed: Sep. 27, 2001

(65) Prior Publication Data

US 2002/0038857 A1 Apr. 4, 2002

(30) Foreign Application Priority Data

Sep. 27, 2000 (AT) .......................................... 1633/2000

(51) Int. Cl.[7] ............................. F16K 31/06; F16K 51/00
(52) U.S. Cl. ................................................. 251/129.15
(58) Field of Search .................................... 251/129.15

(56) References Cited

U.S. PATENT DOCUMENTS

| | | | |
|---|---|---|---|
| 1,674,914 A | | 6/1928 | Murray |
| 2,860,850 A | | 11/1958 | Rhodes et al. |
| 2,863,473 A | | 12/1958 | Gantz |
| 5,323,809 A | * | 6/1994 | Tischer et al. ................ 251/51 |
| 5,467,799 A | * | 11/1995 | Buccicone et al. .......... 251/208 |
| 5,513,905 A | | 5/1996 | Zeides et al. |
| 5,791,247 A | * | 8/1998 | Kolb ...................... 251/129.15 |
| 5,937,884 A | * | 8/1999 | Barnoin et al. .......... 251/129.15 |
| 5,941,502 A | | 8/1999 | Cooper |
| 5,961,052 A | * | 10/1999 | Coldren et al. .......... 251/129.02 |
| 5,975,488 A | * | 11/1999 | Imhof et al. ............ 251/129.18 |
| 6,056,261 A | * | 5/2000 | Aparicio et al. ........ 251/129.03 |
| 6,068,237 A | | 5/2000 | Holmes et al. |
| 6,089,258 A | * | 7/2000 | Busick et al. .................. 251/65 |
| 6,279,604 B1 | * | 8/2001 | Korb et al. .................. 251/293 |
| 6,295,975 B1 | * | 10/2001 | Yew et al. .............. 251/129.15 |

FOREIGN PATENT DOCUMENTS

| | | |
|---|---|---|
| DE | 4343325 | 6/1995 |
| DE | 19854759 | 5/2000 |
| EP | 0878578 | 11/1998 |

* cited by examiner

Primary Examiner—Paul J. Hirsch
(74) Attorney, Agent, or Firm—Dykema Gossett PLLC

(57) ABSTRACT

A fluid valve having a switching magnet (2) detachably mounted on a valve housing (1) whereby an essentially annular retaining disk (7) is fastened to the valve housing (1), which is provided with a first fastening device (12) and which engages with a second fastening device (14) the supporting housing (3) surrounding the coil (4) of the switching magnet (2) at the opposite side of the valve housing (1) preferably in the way of a snap-on connection. The fastening of the switching magnet (2) to the valve housing (1) may thereby be performed in a simple and cost-effective manner.

9 Claims, 2 Drawing Sheets

FLUID VALVE

BACKGROUND OF THE INVENTION

1. Field of the Invention

The invention relates to a fluid valve, particularly a hydraulic valve, having a switching magnet detachably mounted on a valve housing.

2. The Prior Art

Valves of this type are known in a variety of configurations whereby the switching magnet is most often fasten to the side of the valve housing in such a manner that the actuation element, regulated by the magnetic coil at the corresponding flow of current, acts directly upon the control or closing elements of the hydraulic valve. The mounting and fastening of the switching magnet is achieved— especially in this connection regarding a square magnet commonly used for many years—by using through-going bolts at the corners of the iron housing, which iron housing is necessary for creating the magnetic flow. The thereby necessary very long bolts that are screwed into the valve housing represent a considerable part of manufacturing costs in the production of the housing of the switching magnet as well as the long mounting screws themselves (there are, for example, four housing borings and the corresponding bolts to be manufactured and to be available having measurements of 70 mm in length and approximately 3.5 mm in diameter for switching magnets commonly used in a variety of applications, and housings having a 25×25 mm outer cross section dimension and a length of approximately 70 mm.)

An additional disadvantage of the arrangement know in the art may be seen in the fact that four bolt connections have to be loosened or to be tightened during assembly and maintenance or during replacement of the switching magnet, and that positioning of the switching magnet is limited to a 90° rotation on the respective valve housing so that the bolt connection is again aligned.

It is the object of the present invention to provide an improved fluid valve of the above-mentioned type in such a manner that the disadvantages of the known arrangement of this type are avoided, that especially manufacturing costs are reduced, and that assembly, maintenance, and positioning is made easier.

SUMMARY OF THE INVENTION

This object is achieved according to the present invention in a fluid valve of the above-mentioned type in that an essentially annular retaining disk is fastened to the valve housing, which is provided with a first fastening device, and which engages with a second fastening device the supporting housing surrounding the coil of the switching magnet at the opposite side of the valve housing. This retaining disk may thereby be attached to the valve housing before the mounting of the switching magnet—preferably by means of screws independent from the switching magnet—and after this attachment, the switching magnet may be connected and fastened merely by cooperation of the fastening devices. Avoided is any complicated machining of the housing for the switching magnet—this housing must only be provided with a second fastening device at a suitable location which then cooperates with the first fastening device on the retaining disk. This (first) fastening device may be easily designed in a manner know in the art so that a relative rotation is made possible between the valve housing and the switching magnet, and which rotation allows free positioning of the switching magnet in consideration of structural conditions.

In a preferred embodiment of the invention the retaining disk has an engaging projection at its outer circumference and the housing surrounding the coil of the switching magnet has at its inner circumference at least one groove as a fastening device in the form of a snap-on arrangement cooperating with the engaging projection. This makes possible the very simple manufacturing of cooperating snap-on arrangements whereby assembly and dismantling is simplified.

In another embodiment of the invention, the front region of the housing surrounding the switching magnet coil that faces the valve housing may have a slot-shaped recess to receive auxiliary elements attached to the coil, particularly switch elements, whereby the grooves or projections of the retaining disk or the housing are formed to run along the entire remaining circumference, respectively. The slot-like recess of the housing in the region of the circumferential grooves or projections cooperating as a snap-on arrangement makes possible a slightly resilient widening of the housing during the sliding-on (of the housing) onto the retaining disk and it may also serve as a resilient pre-tensioning means for the locked snap-on connection at corresponding dimensioning of the cooperating grooves or projections. Very simple assembly is thereby possible while having a very secure connection between the switching magnet and the valve housing whereby it is unimportant whether the grooves are in the housing and the projections are on the retaining disk or if they are arranged in reverse order as long as there is guaranteed the cooperation of these elements to fasten the housing together with the coil onto the retaining disk and thereby onto the valve housing.

In an additional preferred embodiment of the invention the grooves and projections are rounded off in the form of semicircles in a cross-sectional view, which makes an easy and simple production of the snap-on connection possible, especially in conjunction with the above-discussed slightly resilient expandable front side of the housing of the switching magnet.

The invention will be explained in more detail by embodiment examples and partially illustrated schematically in the drawings.

DETAILED DESCRIPTION OF THE PREFERRED EMBODIMENT

Figure 4:
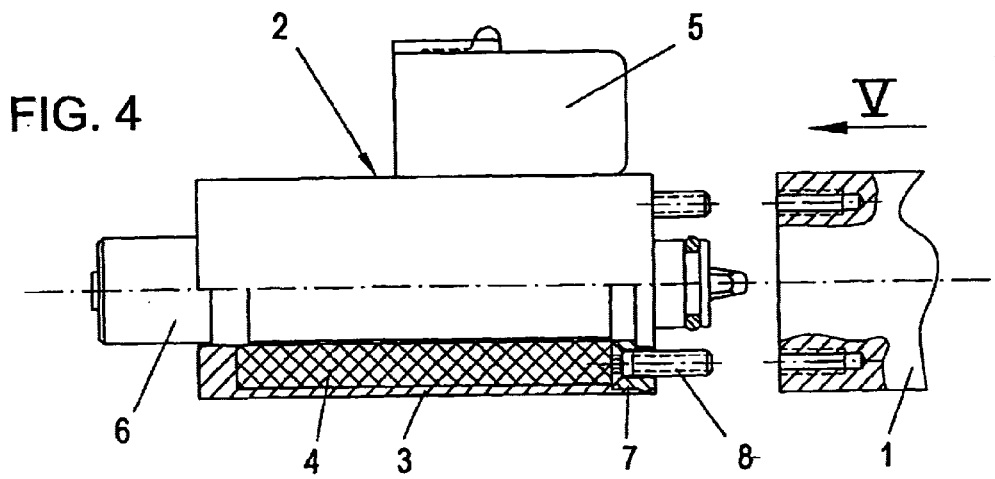
FIG. 4 shows the switching magnet according to FIG. 1 assembled before mounting to a valve housing.
Figure 5:
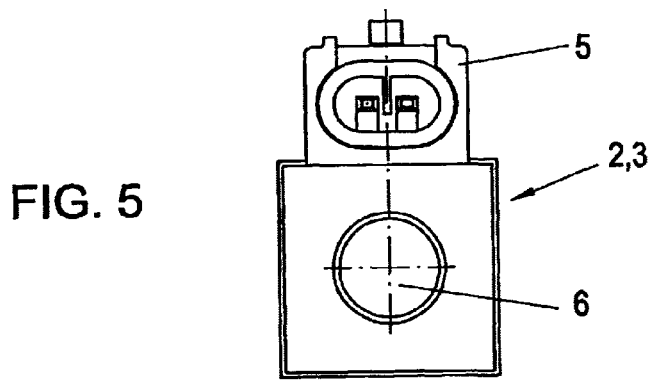
FIG. 5 shows a view along arrow V in FIG. 4.

The fluid valve shown in both FIGS. 4 and 5 is provided with a switching magnet 2 mounted detachably on a valve housing 1 (not illustrated in detail), the switching magnet 2 including a housing 3, a coil 4 having attached auxiliary elements 5 (e.g. switch elements), and a pressure pipe 6 adjustable to the corresponding flow of current in the coil. An essentially annular retaining disk 7 (see especially FIG.

Figure 6:
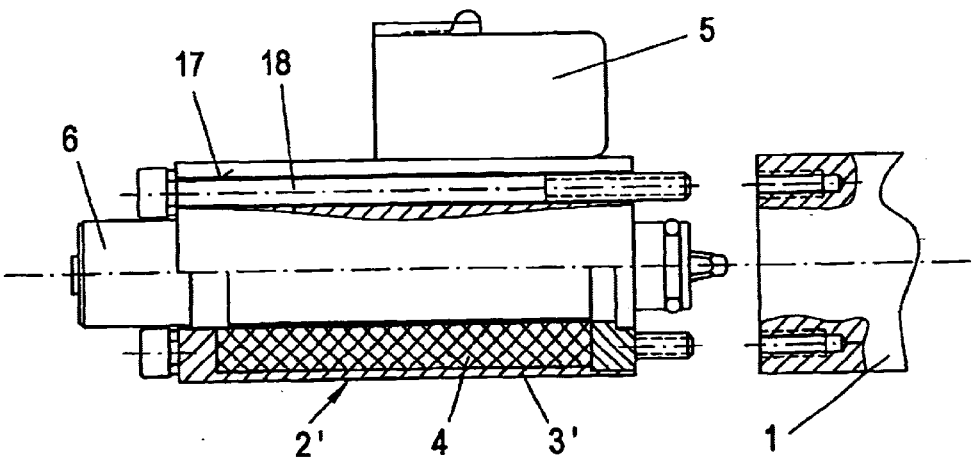
FIG. 6 shows in an illustration according to FIG. 4 a fluid valve according the current state-of-the-art.

1) is fastened to the valve housing 1 by means of four screws 8 independent from the housing 3 and the coil 4—contrary to the illustration of FIG. 4 chosen to clarify the difference compared to FIG. 6—whereby this fastening has to occur in this case after the sliding-on onto the pressure pipe 6, which in turn has been already inserted into the valve housing 1 together with the pressure pipe 6 since the pipe 6 is secured on a bore 10 of the retaining disk 7 by means of a collar 9. However, in a corresponding configuration of the housing 3 the pressure pipe 6 could be pushed on later and inserted together with the housing 3 and coil 4 independent from the retaining disk 7.

After the attachment of the retaining disk 7 to the valve housing 1 with relatively short screws 8, the coil 4 can be at first be pushed onto the pressure pipe 6 and then the housing 3 can be pushed outside over the coil 4. The retaining disk 7 is provided at its outer circumference 11 with a first snap-on arrangement 12, which is here formed by a circumferential projection 13 having the approximate shape of a semicircle (radius R) in a cross-sectional view. The housing 3 is provided with a second snap-on arrangement 14 at the inner circumference and in the region of the end facing the valve housing 1, which according to FIG. 2 is formed by a circumferential groove 15 having the approximate shape of a semicircle (radius R) in a cross-sectional view.

Figure 1:
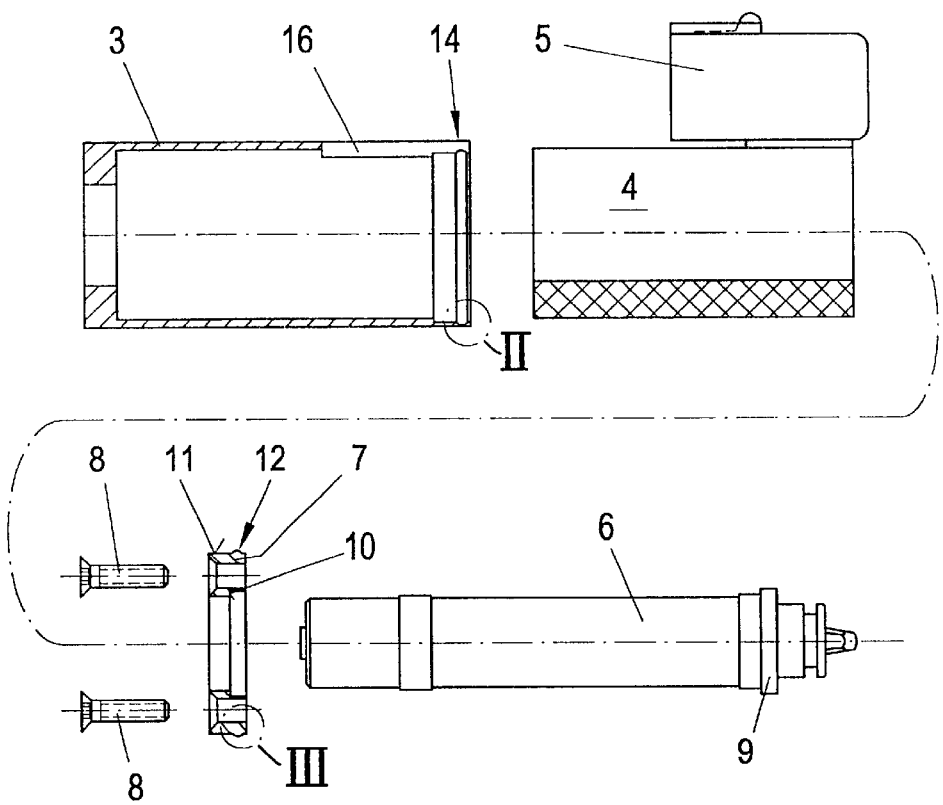
FIG. 1 shows in a kind of exploded view a switching magnet together with a retaining disk for a fluid valve according to the invention.
Figure 2:
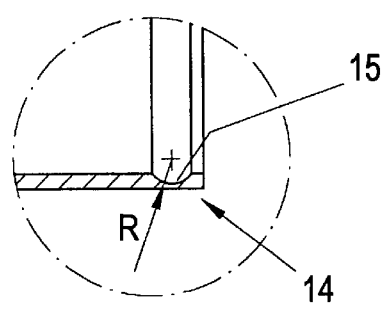
FIGS. 2 and 3 show details II and III from FIG. 1 on a larger scale.
Figure 3:
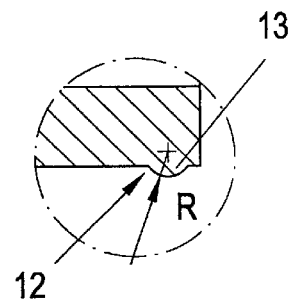

The front region of the housing 3 surrounding the coil 4 of the switching magnet 2 and facing the valve housing 1 has in the area 16 a slot-like recess to receive auxiliary elements 5 that are attached to the coil 4 according to FIG. 1, whereby the housing 3 can slightly spring back so that during the sliding-on of the partial section shown in FIG. 2 and FIG. 3 it will lead to the interlocking of the projection 13 and the groove 15, and whereby the coil 4 of the housing 3 will be securely held in place on the retaining disk 7 and thereby also on the valve housing 1.

From the illustration of the state-of-the-art in FIG. 6 it can be seen that here there are necessary borings 17 going through the entire length of the housing 3' and correspondingly long bolts 18 at the four corners of the housing 3' to fasten the switching magnet 2' to the valve housing 1, which is otherwise designed the same. This not only makes manufacturing more expensive but it also restricts the free rotation of the switching magnet 2' about its axis before assembly as it could become necessary, for example, when the auxiliary elements 5 are to take a specific relative position as a result of structural conditions.

Aside from the illustrated specific development of the two snap-on arrangements 12 and 14, other known and suitable elements could of course be provided—essential is only the fact that the fastening of the housing 3 together with the coil 4 and possibly also with the pressure pipe 6 to the valve housing 1 is not performed as up to now and in this conjunction with long through-going bolts (18 according to FIG. 6) but that only a retaining disk 7 is fastened to the valve housing 1 onto which the housing 3 together with the coil 4 may be easily mounted by simple and cost-effective means. This could also be achieved in a simple manner, for example, by some screws disposed around the circumference that are screwed from the side through the housing 3 into the retaining disk 7 or the like, whereby the corresponding thread borings in the retaining disk 7 could also be added later during the assembly to make free positioning possible.

I claim:

1. A fluid valve which comprises:
   a valve housing defining an end,
   a switching magnet which includes a magnet housing defining an end and a coil positioned within the magnet housing, said end of said magnet housing including a radially-projecting first fastening means, and
   an essentially annular retaining disk attached to said end of said valve housing, said retaining disk including a radially-projecting second fastening means which is engagable with said first fastening means to detachably connect said switching magnet to said valve housing.

2. A fluid valve according to claim 1, including screws which extend through said retaining disk into the valve housing to attach the retaining disk to the end of the valve housing.

3. A fluid valve according to claim 1, wherein said first fastening means comprises a groove in an inside wall of the magnet housing and the second fastening means comprises a projection extending outwardly from the retaining disk.

4. A fluid valve according to claim 3, wherein said magnet housing includes a longitudinal slot which extends away from said end thereof, and said switching magnet includes an auxiliary device which is connected to said coil and extends through said slot to project away from the magnet housing.

5. A fluid valve according to claim 4, wherein said auxiliary device is a switch element.

6. A fluid valve according to claim 4, wherein said groove extends from said slot annularly around the magnet housing, and the projection extends annularly around the retaining disk.

7. A fluid valve according to claim 4, wherein said projection has a semicircular shape in cross section.

8. A fluid valve which comprises:
   a valve housing defining an end,
   a switching magnet which includes a magnet housing defining an end and a coil positioned within the magnet housing, said end of said magnet housing including a first fastening means, and
   a retaining disk attached to said end of said valve housing, said retaining disk including a second fastening means which can snap-fit with said first fastening means to detachably connect said switching magnet to said valve housing.

9. A fluid valve which comprises:
   a valve housing defining an end,
   a switching magnet which includes a magnet housing defining an end and a coil positioned within the magnet housing, said end of said magnet housing including a first fastening means,
   a pressure pipe which extends through said switching magnet and within said coil to communicate with said valve housing, and
   an essentially annular retaining disk attached to said end of said valve housing, said retaining disk including a second fastening means which is engagable with said first fastening means to detachably connect said switching magnet to said valve housing.

* * * * *